(12) United States Patent
Lu et al.

(10) Patent No.: US 8,793,307 B2
(45) Date of Patent: Jul. 29, 2014

(54) CONTENT ASSOCIATIVE CACHING METHOD FOR WEB APPLICATIONS

(75) Inventors: Wei Lu, Austin, TX (US); Jamshid Mahdavi, San Jose, CA (US); Darrell Long, Austin, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1180 days.

(21) Appl. No.: 12/695,996

(22) Filed: Jan. 28, 2010

(65) Prior Publication Data
US 2010/0191805 A1 Jul. 29, 2010

Related U.S. Application Data

(60) Provisional application No. 61/148,007, filed on Jan. 28, 2009.

(51) Int. Cl.
*G06F 15/16* (2006.01)

(52) U.S. Cl.
USPC ............................. 709/203; 709/201; 709/202

(58) Field of Classification Search
None
See application file for complete search history.

(56) References Cited

U.S. PATENT DOCUMENTS

| 7,203,741 B2 | 4/2007 | Marco et al. | |
| 2007/0198726 A1 | 8/2007 | Marco et al. | |
| 2007/0245090 A1 * | 10/2007 | King et al. | 711/129 |
| 2009/0327729 A1 * | 12/2009 | Rhodes et al. | 713/171 |
| 2010/0005171 A1 * | 1/2010 | Arolovitch | 709/225 |

* cited by examiner

*Primary Examiner* — Umar Cheema
(74) *Attorney, Agent, or Firm* — Ascenda Law Group, PC

(57) ABSTRACT

A cache logically disposed in a communication path between a client and a server receives a request for a content item and, in response thereto, requests from the server header information concerning the content item and an initial portion of data that makes up the content item. The cache then computes a first hashing value from the header information and a second hashing value from the initial portion of data. A content identifier is created by combining the first hashing value and the second hashing value. Using the content identifier, the cache determines whether a copy of the content item is stored by the cache; and, if so provides same to the client. Otherwise, the cache requests the content item from the server and, upon receipt thereof, provides it to the client.

28 Claims, 2 Drawing Sheets

CONTENT ASSOCIATIVE CACHING METHOD FOR WEB APPLICATIONS

RELATED APPLICATIONS

This application is a Non-Provisional of, claims priority to and incorporates by reference U.S. Provisional Patent Application 61/148,007 filed 28 Jan. 2009.

FIELD OF THE INVENTION

The present invention relates to techniques for improving cache hit rates for asymmetric caching schemes.

BACKGROUND

The Internet, and other networks based on the Internet Protocol (IP) in general, has evolved from a simple information sharing platform to a critical infrastructure for commerce, entertainment, education, government and many other aspects of personal and institutional life. The amount of traffic flowing through this infrastructure increases on a daily basis and this trend expected to continue in the future. Consequently, network administrators and providers that must support the Internet infrastructure are faced with continuing challenges occasioned by such growth.

Caching is a popular, and perhaps the only, technique which has been used to try and meet the need for improved user experiences in the face of increased network traffic over the Internet. In practice, two caching techniques are used: symmetric caching and asymmetric caching. In symmetric caching, traffic flowing through multiple network nodes is cached on caching devices deployed at these nodes. Network traffic between the nodes can then be reduced by transferring tokens representative of the cached contents between the cache devices. The technique is symmetric, as it requires two nodes to cooperate with each other.

In asymmetric caching, traffic flowing through a network node is analyzed and that portion of the traffic that can be identified by well-known naming schemes, such as a Uniform Resource Indicator (URI) in Hypertext Transfer Protocol (HTTP) traffic, a filename in Common Internet File System (CIFS) traffic, etc., is cached on a caching device installed on the node. The cached contents are then used to reduce traffic between the caching node and the content source node for the named contents (e.g., the origin server for a web page or the like). The traffic reduction is achieved by responding to requests for the named contents out of the cache, rather than passing on requests for copies of the original contents to the source node. Asymmetric caching is popular in application proxy gateways and is so named because it does not require participation from other nodes (such as the origin server, etc). ProxySG™ from Blue Coat Systems, Inc., Squid from the open source community and ISA™ from Microsoft Corporation are representative examples of asymmetric caching implementations.

There are technical and practical limitations of existing symmetric and asymmetric caching techniques. For example, it is not practical, and oftentimes is cost prohibitive, to deploy caching devices to cover all possible network paths. Furthermore, different techniques use different protocols between cooperating caching devices. Symmetric caching techniques are therefore only suitable within network environments where the presence of compatible caching devices can be assured, such as enterprise networks with widely distributed branch offices.

While asymmetric caching techniques can be employed more generally within heterogeneous network environments than can symmetric caching techniques, asymmetric caching is increasingly becoming less effective in reducing network traffic. In part, this is due to the evolving, dynamic nature of content naming schemes and of the content itself. Most asymmetric caching techniques use application-specific naming schemes as identifiers to the cached contents. These techniques had shown good cache results (e.g., good cache hit rates) in the early days of the Web, when most content was static and fixed naming schemes were used to refer to that content. In today's Web world, however, an ever increasing number of content naming schemes are being used to refer to the same content. Using content naming schemes as content identifiers now often results in very poor cache hit rates. Further, as more and more content items are being delivered based on combinations of fixed naming schemes and other, dynamic parameters, such as cookies, arguments and time codes, asymmetric caching installations that rely solely on fixed naming schemes will often deliver the wrong cached contents.

SUMMARY OF THE INVENTION

In one embodiment, a cache logically disposed in a communication path between a client and a server receives a request for a content item and, in response thereto, requests, from the server, header information concerning the content item and an initial portion of data that makes up the content item. The cache then computes a first hashing value from the header information and a second hashing value from the initial portion of data. A content identifier is created by combining the first hashing value and the second hashing value. Using the content identifier, the cache determines whether a copy of the content item is stored by the cache; and, if so provides same to the client. Otherwise, the cache requests the content item from the server and, upon receipt thereof, provides it to the client. The same content item along with its content identifier may be stored in the cache.

BRIEF DESCRIPTION OF THE DRAWINGS

The present invention is illustrated by way of example, and not limitation, in the figures of the accompanying drawings in which.

DETAILED DESCRIPTION

Recognizing the shortcomings of conventional asymmetric caching techniques in the modern Web world, the present inventors have developed new techniques for identifying cached content. Instead of using fixed naming schemes as content identifiers, the present techniques use content signatures to identify cached content. Fixed naming schemes and heuristic methods to incorporate dynamic parameters may be used as hints to cached contents, thereby reducing collision rates and false cache hit rates.

Figure 1:
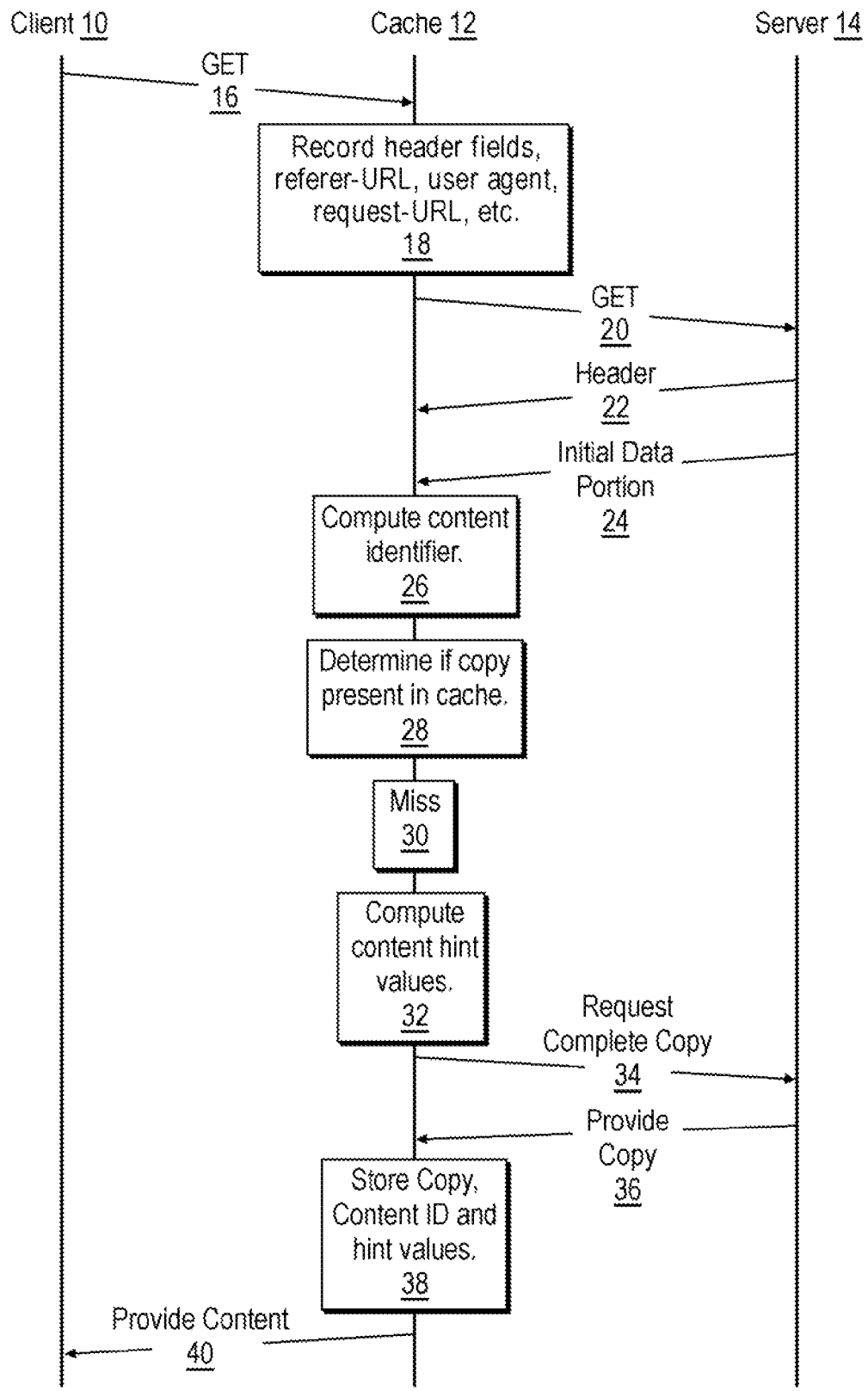
FIG. 1 illustrates a series of communications between a client, a cache and an origin server, and a process for storing a copy of a requested content item and an associated content identifier at the cache, in accordance with an embodiment of the present invention.

To better understand the present invention, refer first to FIG. 1. The illustration shows a series of communications between a client 10, a cache 12 and an origin server 14. Assume that the cache 12 is logically disposed in a communication path between the client 10 and server 14. Precisely where the cache is located in this communication path is not critical to the present invention. The cache may be located on the same physical machine as the client 10 or the server 14, but in many instances will be on a physical machine separate from both of these units. Often, the client 10 will be a Web browser executing on a computer system, but this is not necessarily so. Other client applications may also be used in connection with the present invention.

For purposes of the present example, the client 10 will be assumed to be a Web browser seeking content that is not yet stored in cache 12. Ignoring for purposes of the present explanation any protocol handshaking messages, when the client 10 seeks content (e.g., an object associated with a Web page), the client issues an HTTP GET 16. The GET is designed to retrieve whatever information is identified by the request-URI. In the case of a Web page with associated objects, the request-URI identifies the object. Because cache 12 is logically disposed between the client and the server, cache 12 receives the GET. More generally, cache 12 establishes a proxy connection with client 10 and captures each content request from the client, including all of the protocol headers.

At the cache 12, various information concerning the client's request is recorded (e.g., stored in memory). For example, cache 12 may record 18 various header fields of interest in the request, the referer-URL (uniform resource locator), user agent, and request-URI. Later, this information may be used in connection with the development of a signature or fingerprint for the requested content.

After recording this information, the cache 12 forwards the GET request 20 to the server 14. In response, the server 14 starts to return the requested content, beginning with a header 22, and an initial portion (say 64 Kbytes or less, e.g., even as little as 5-8 Kbytes) 24 of the response body. The cache 12 can ensure that only this initial portion of the response body is transferred by the server through careful control of its Transmission Control Protocol (TCP) window. A TCP window is the amount of outstanding (i.e., unacknowledged by the recipient) data a sender, like server 14, can send on a particular connection before it must await further information from the receiver (cache 12 in this case). For example if a TCP connection between two computer systems has a TCP window size of 64 Kbytes, then the sending computer system can only transmit 64 Kbytes of data and then must stop and wait for an additional window to be advertised by the receiving computer system before it is permitted to send any more data.

By limiting its TCP window to a small size, say 64 Kbytes or even as little as 5-8 Kbytes, and delaying advertising an additional receive window, the cache 12 can control the amount of data sent by server 14 in response to the GET 20. This allows cache 12 time to compute a signature or fingerprint for the content being returned by server 14 to determine whether or not a copy of that content is already stored at the cache. If a copy exists, cache 12 can either close the connection to the server 14 or suspend the connection to the server 14 by manipulating the advertised TCP window size, and respond to the client's GET request 16 with the cached copy of the requested content. Otherwise, the cache 12 can request the remaining content data from the server 14 and transfer same to the client, retaining a copy of the content in the cache in order to serve any later requests therefor. The decision as to whether to close or suspend the connection depends on the protocol context of the connection. For example, in the case of a stateless or cookie-based stateful web application connection, closing the connection to the server 14 would have no impact on the web application even when both client 10 and server 14 support persistent connections.

In one embodiment of the invention, the content signature or fingerprint, more generally referred to as the content identifier, consists of a combination of a first hashing value of content type, size and type-specific metadata (obtained from the header information 22—note, this header information can include both a protocol header, such as an HTTP response header, and header information for the subject content item) and a second hashing value of the initially captured content data 24. The combination may be any convenient combination, such as a concatenation, addition, multiplication, or other combination. The first and second hashing values may be computed using a common hashing function or different hashing functions. For example, relatively weaker hashing functions may be used in connection with the header information, while relatively stronger hashing functions may be used in connection with the actual content. This would help to ensure uniqueness of content item identifiers and reduce the chances for false positive cache hits.

Thus, once the cache 12 has received the header 22 and the initial data 24, the cache computes the content signature 26. Using this content identifier, the cache 12 checks to determine whether or not a copy of the requested content is already stored in the cache. This is done, in one embodiment, by comparing the content identifier computed on the basis of the information returned from server 14 with a list of content identifiers associated with content items already stored in the cache. For example, cache 12 may maintain a table or other data structure in memory which stores identifiers associated with all of the content items stored in the cache. If the newly computed content identifier matches one of these stored entries (i.e., in the event of an apparent cache hit), the cached copy of the content may be provided to the requesting client as discussed below in connection with FIG. 2. Here, however, for purposes of the present example, it is assumed that no matching results are found (i.e., a cache miss 30 occurs).

In the event of a cache miss (or in instances where for other reasons the cached copy of a content item should not be returned to the client), the cache 12 will compute 32 content hint values including, for example, a hash of the referer-URL, a hash of the user agent type, a hash of the normalized URI, the number of arguments, and an argument name and argument value size and hash. The hint values may be used in connection with later requests for the subject content, as discussed further below.

Concurrently with or subsequent to computing the hint values, the cache 12 requests the remaining portions of the content data from the server 34 and the server returns the requested content 36. As is known in the art, this may be done in a series of requests and responses according to the advertised TCP window of the cache (which may now be made larger than was the case for the retrieval of the initial content data so as to reduce the overall latency of the process). The content is stored 38 in the cache along with the content identifier and the hint values, and a copy of the content is returned 40 to the requesting client.

Of course, other means of computing, developing or using a content identifier can also be used. For example, rather then use a concatenation of hashing values, one could use a single hashing value computed over a concatenation or other combination of the content type, size and type-specific metadata along with some or all of the initially captured content data. Further, in cases where two (or perhaps more) hashing values are used, one could perform initial cache look ups (as discussed above) using only the first hashing value as an initial content identifier and, in the event of a cache hit, perform a second cache look up using the second hashing value as a subsequent content identifier to see if the same hit is returned. A true cache hit may be declared only in cases where both (or all, in the case of more than two identifiers or identifier portions) hits yield the same cached content item, thus reducing the rate of false cache hits.

Figure 2:
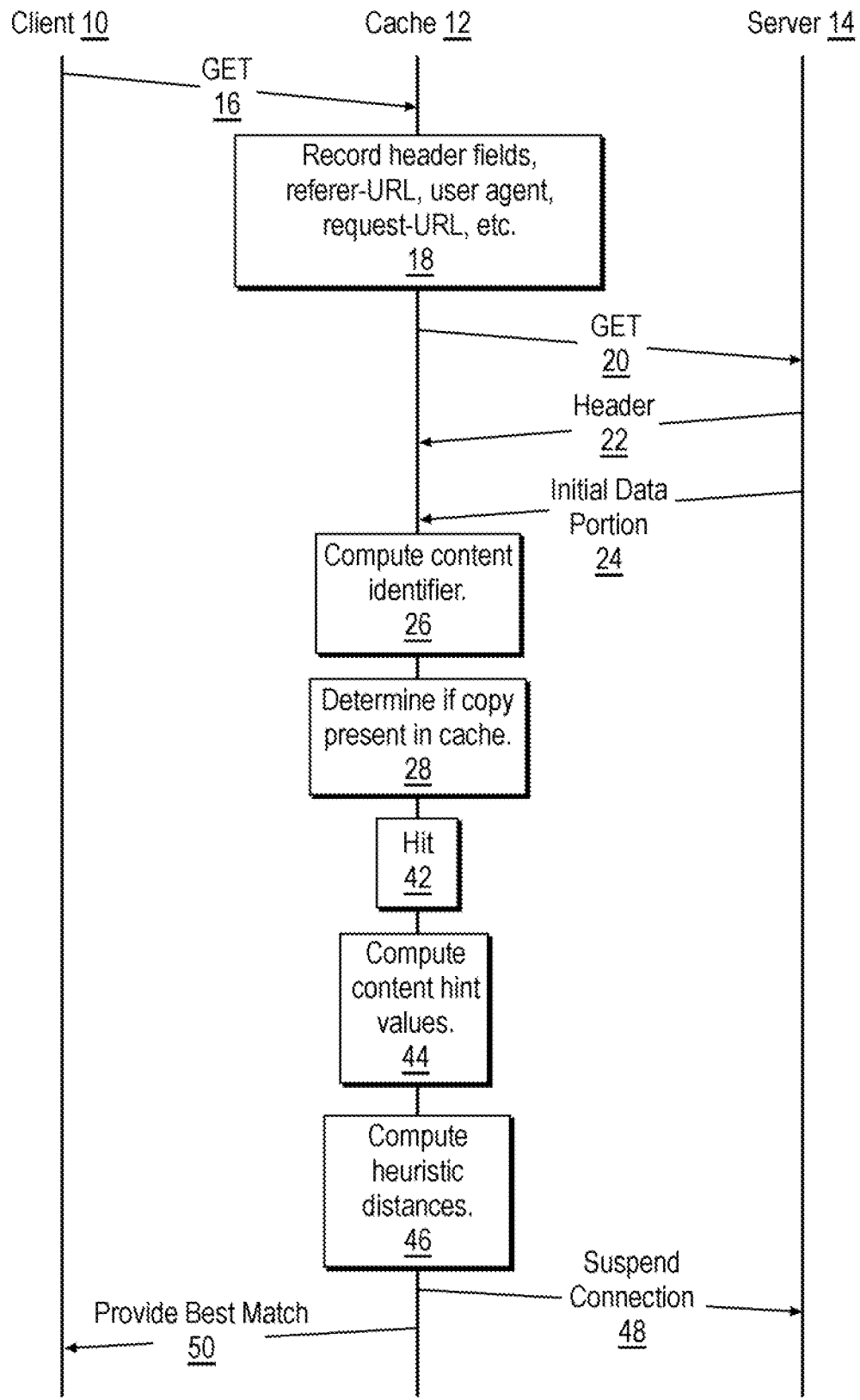
FIG. 2 illustrates a process of retrieving previously cached content and returning same to a requesting client, in accordance with an embodiment of the present invention.

Referring now to FIG. 2, the process of retrieving previously cached content and returning same to a requesting client, in accordance with one embodiment of the present invention, will now be discussed. As shown in the illustration, the process is similar to that discussed above, up to the point where the cache determines whether or not a copy of the requested content exists in the cache, based on whether or not a matching content identifier is located 28. In this case, we will assume that a match is found (i.e., a cache hit 42 occurs).

As before, the content hint values are computed 44. The content hint values may include a hash of the referer URL, a hash of the user agent type, a hash of the normalized URI, and the number of arguments, argument name and argument value size and hash thereof. Using these values, the cache 12 computes a heuristic distance between the computed hint values and the stored hint values associated with the cached contents 46. The cache 12 then suspends the connection with the content source (i.e., server 14) 48 and serves 50 the cached contents with the best match to the requesting client 10. The best match may be determined on the basis of a minimum heuristic distance between the computed and stored hint values in the event more than one cache hit for a given content identifier occurs.

Several optimizations or variations on the above-described processes may be implemented. For example, if the size of the requested content item is small, say less than 32 Kbytes, then the content item may not/need not be cached. Caching such small objects likely provides little benefit in the context of reducing overall network traffic and introduces needless latencies into fulfilling requests.

Also, the process(es) used to determine a heuristic distance between hint values may be a function of content type. For content types having metadata that can uniquely identify the content data, the process can be a constant of zero. That is, one would always be assured that the cache hit is to the correct content item.

Further, for those content items where size information is included in the response header, the cache can increase the size of its initially advertised TCP window so that the amount of initially captured content data is relatively large. Such a large data chunk would yield a hashing value more likely to be unique from other such values computed for other content items. Stated differently, increasing the size of the initial captured data would likely reduce the false cache hit rate because the hashing values computed for the returned content data would be computed over larger data sets. In addition, the cache can include configurable parameters to fine tune the caching process to increase the cache hit rate and reduce the false cache hit rate.

Another means of reducing the false cache hit rate is to "spot check" the cached content against its counterpart on the origin server. For example, in the event the cache determines that it stores a copy of the requested content, before returning that cached copy to the requesting client the cache could request from the origin server a designated portion of the file that makes up the content item (e.g., using an HTTP byte range request) and compare same to the corresponding byte range of the cached version of the file. If the two versions are the same, the cache can be certain that it is highly likely that the cached version of the content is the same as that stored on the origin server, and can provide the cached version to the requesting client. In some instances, such a byte range request may be made on a connection different from that originally used between the cache and the server, as the existing connection is delayed and will either be resumed or suspended, as described above.

Many existing cache devices, particularly asymmetric web caches, process client requests without forwarding same to the origin server or manipulate the requests before forwarding them to the origin server. Such request processing without origin server validation or request manipulation can create potential vulnerabilities (from a security standpoint) and/or break logic states of the original web applications. For example, in addition to specifying content items, modern web applications often include other information critical to the application in their requests. This can include authentication or authorization tokens and application states. Returning cached content items without validating the request with an origin server could result in the compromise of such information.

The present invention addresses these potential vulnerabilities by preserving the operational and logic flow of a web application. Cached content items are returned to a requesting client only after the client's request is validated by an origin server. For example, in one implementation if a client seeks a content item from an identified origin server, a cached version of that content item is provided only if the cached item can be verified as having originated from the origin server identified in the request. Further, the client receives all of the origin server's original response headers, which can include new application states and additional authentication and authorization tokens.

By validating content requests against the origin server, the present invention also addresses a further security concern. Suppose for example that malicious content having the same signature as the true content it is masquerading as (e.g., an initial portion which yielded a content identifier that is the same as the true content) was planted on a server and that malicious content found its way onto a cache. If a client seeking the true copy of the content were to contact the cache, and no origin server validation were used, it is possible, perhaps even likely, that the malicious version of the content would be downloaded to the client.

The origin server validation technique proposed herein prevents this situation, inasmuch as the cache is configured to provide the cached version of a content item only if the cached copy can be identified as having come from the source (e.g., the same server or domain) identified in the client's request. Because the rogue server storing the malicious content is unlikely to have an address corresponding to the true origin server specified in the client's request, the cache would not provide the cached malicious content but instead would obtain a copy of the true content from the origin server and provide same in response to the client's request.

Throughout the foregoing discussion, specific examples have been used in order to better provide the reader with an understanding of the present invention. However, the invention is not limited to these examples. For instance, although the above discussion focused on web applications, the present approach is also applicable to other application protocols, such as peer-to-peer protocols, streaming media protocols and file sharing protocols. Therefore, the invention should not be deemed limited by the use of such examples and, instead, should only be measured in terms of the claims, which follow this description.

Further, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that the discussions of algorithms and symbolic representations of operations on data within a computer memory which are set forth above are the most convenient means used by those skilled in the computer science arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It should be borne in mind, however, that use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise an appropriately configured computer system operating under the instructions of a computer program stored in the computer system, which program is designed to cause the computer system to perform the above-described operations. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus and accessible by a computer processor capable of reading and executing the stored instructions to cause the computer system to perform the desired operations expressed by the program.

The cache described herein may be a cache configured to store content in a single layer, or a cache configured with multiple layers as described in commonly owned U.S. patent application Ser. No. 11/690,669, filed 23 Mar. 2007. In this context, application proxies may be configured in accordance with the above described techniques for identifying cached content using content signatures. In addition, a cache configured in accordance with the present invention may also incorporate optimization techniques such as intra-stream compression, predictive caching and policy-based content filtering.

What is claimed is:
1. A method, comprising:
responsive to a request for a content item received at a cache logically disposed in a communication path between a client and a server, requesting from the server header information concerning the content item and an initial portion of data comprising the content item, the initial portion being less than a complete file which comprises the content item;
computing a first hashing value from the header information and a second hashing value from the initial portion of data;
combining the first hashing value and the second hashing value to derive a content identifier;
determining, based on the content identifier, whether a copy of the content item is stored by the cache; and
based on said determination, either providing the copy of the content item from the cache to the client or requesting the content item from the server and, upon receipt thereof, providing same to the client.

2. The method of claim 1, wherein requesting comprises sending an HTTP request.

3. The method of claim 2, wherein the HTTP request comprises an HTTP GET request.

4. The method of claim 1, wherein requesting comprises sending a byte range request.

5. A method, comprising:
storing, in a memory of a cache logically disposed between a client and a server, information associated with a request issued by the client;
at the cache, forwarding the request to the server, and, upon receiving an initial portion of a response to the request, computing a content signature for the response;
determining, based on the content signature, whether or not a cached copy of content associated with the request is already stored by the cache and
if so, returning the cached copy of the content in response to the request, otherwise continuing to download the content from the server, storing a copy of said content in the cache and responding to the request by providing a copy of the content to the client.

6. The method of claim 5, wherein the information associated with the request comprises fields of a header associated with the request.

7. The method of claim 6, wherein the fields of the header include some or all of a referer-uniform resource locator (URL), user agent, and request-uniform resource indicator (URI).

8. The method of claim 5, wherein prior to forwarding the request from the cache, limiting a size of a receive window.

9. The method of claim 8, wherein after receipt of the initial portion of the response, the cache delays advertising of the receive window until after the content signature of the response has been computed and the cache has determined whether or not the copy of the content comprising the response is already stored by the cache.

10. The method of claim 5, wherein prior to returning the cached copy of the content, closing or suspending a connection to the server.

11. The method of claim 5, wherein the content signature comprises a combination of a first hashing value of content type, size and type-specific metadata, and a second hashing value of the initial portion of the response.

12. The method of claim 11, wherein the type-specific metadata is obtained from header information in the response.

13. The method of claim 11, wherein the combination comprises one of a concatenation, an addition, or a multiplication.

14. The method of claim 11, wherein the first and second hashing values are computed using different hashing functions.

15. The method of claim 14, wherein a relatively weaker hashing function is used in connection with the first hashing value, and relatively stronger hashing function is used in connection with the second hashing value.

16. The method of claim 5, wherein determining whether or not a cached copy of the content associated with the request is already stored by the cache comprises comparing the content signature with a list of content identifiers associated with content items already stored in the cache.

17. The method of claim 5, wherein if a cached copy of the content associated with the request is not already stored by the cache, computing and storing content hint values for use in connection with subsequent requests for the content.

18. The method of claim 17, wherein the content hint values comprise one or more of a hash of the referer-URL, a hash of a user agent type, a hash of a normalized URI, a number of arguments, and an argument name and argument value size and hash.

19. The method of claim 17, wherein the content hint values are computed concurrently with requesting remaining portions of the content from the server.

20. The method of claim 5, wherein the content signature comprises one of a concatenation of hashing values; or a single hashing value computed over a concatenation or other combination of content type, size and type-specific metadata along with some or all of the initial portion of the content.

21. The method of claim 18, wherein the cache computes a heuristic distance between computed hint values and stored hint values associated with the cached content and serves that cached content having a best match in response to the request.

22. The method of claim 21, wherein if there is more than one cache hit for the content signature, the best match is determined based a minimum heuristic distance between the computed and stored hint values.

23. The method of claim 21, wherein processes used to determine a heuristic distance between hint values are a function of content type.

24. The method of claim 5, wherein, if the cache determines that it stores a cached copy of the content associated with the request, before returning the cached copy to the client, validating that the cached copy was obtained from a same server or domain as the currently requested content.

25. The method of claim 5, wherein, if the cache determines that it stores a cached copy of the content associated with the request, before returning the cached copy to the client, requesting from the server a designated portion of a file comprising the content and comparing the designated portion of the file returned by the server to a corresponding portion of the cached copy of the content.

26. The method of claim 25, wherein the designated portion of the file comprises a byte range.

27. The method of claim 25, wherein, if the cache determines that the cached copy of the content is the same as the designated portion of the file returned by the server, providing the cached copy of the content to the client.

28. The method of claim 25, wherein the request for the designated portion of the file is made on a connection different from that originally used between the cache and the server to request the content.

* * * * *